(12) United States Patent
Michaels et al.

(10) Patent No.: US 8,755,692 B2
(45) Date of Patent: Jun. 17, 2014

(54) WIRELESS DATA TRANSMISSION WITH TERAHERTZ WAVES

(75) Inventors: Ralph Michaels, Bergisch Gladbach (DE); Hans Joachim Einsiedler, Berlin (DE); Thomas Moersdorf, Steinbach im Taunus (DE); Gerhard Kadel, Darmstadt (DE); Josef Kraus, Dieburg (DE); Klaus Milczewsky, Seeheim-Jugenheim (DE); Michael Kern, Berlin (DE); Karsten Buse, Bonn (DE); Ingo Breunig, Bonn (DE); Rosita Sowade, Bonn (DE); Jens Kiessling, Bonn (DE); Bastian Knabe, Bonn (DE)

(73) Assignee: Deutsche Telekom AG, Bonn (DE)

( * ) Notice: Subject to any disclaimer, the term of this patent is extended or adjusted under 35 U.S.C. 154(b) by 356 days.

(21) Appl. No.: 12/936,717

(22) PCT Filed: Apr. 8, 2009

(86) PCT No.: PCT/DE2009/000489
§ 371 (c)(1),
(2), (4) Date: Dec. 23, 2010

(87) PCT Pub. No.: WO2009/129772
PCT Pub. Date: Oct. 29, 2009

(65) Prior Publication Data
US 2011/0142452 A1 Jun. 16, 2011

(30) Foreign Application Priority Data
Apr. 23, 2008 (DE) .......... 10 2008 020 466

(51) Int. Cl.
*H04B 10/00* (2013.01)

(52) U.S. Cl.
USPC ........... 398/115; 398/118; 398/130; 398/131; 398/156

(58) Field of Classification Search
USPC .................. 398/115, 130, 131, 156, 140, 118
See application file for complete search history.

(56) References Cited

U.S. PATENT DOCUMENTS 6,816,112 B1   11/2004   Chethik
7,054,339 B1   5/2006    Hu et al.
(Continued)

FOREIGN PATENT DOCUMENTS

DE   10 2005 000937 A1   7/2006
EP   1 161 006 A2        12/2001
WO   WO 2004/010589 A2   1/2004

OTHER PUBLICATIONS

Juarez et al. "Free-Space Optical Communications for Next-generation Military Networks" IEEE Communications Magazine, IEEE Service Center, Piscataway, USA. vol. 44, No. 11, Nov. 1, 2006, p. 48. XP 011143573; ISSN: 0163-6804.

(Continued)

*Primary Examiner* — Daniel Washburn
*Assistant Examiner* — Hibret Woldekidan
(74) *Attorney, Agent, or Firm* — Leydig, Voit & Mayer, Ltd.

(57) ABSTRACT

A method for wireless data transmission between a transmitter and a receiver includes modulating signals onto an electromagnetic carrier wave in a frequency range between 0.1 and 10 terahertz, and transmitting the carrier wave by the transmitter and focusing the transmitted carrier wave in the direction of the receiver. The transmitter is aimed towards the receiver by an adjusting system using a wireless communication link between the transmitter and the receiver so as to provide automatic aiming.

14 Claims, 1 Drawing Sheet

(56) References Cited

U.S. PATENT DOCUMENTS

| | | | |
|---|---|---|---|
| 7,333,094 B2* | 2/2008 | Lieberman et al. | 345/175 |
| 7,573,465 B2* | 8/2009 | Lieberman et al. | 345/175 |
| 8,411,350 B2* | 4/2013 | Fu et al. | 359/325 |
| 2002/0036814 A1* | 3/2002 | Mueller et al. | 359/180 |
| 2002/0085255 A1 | 7/2002 | Gavish | |
| 2002/0131121 A1* | 9/2002 | Jeganathan et al. | 359/152 |
| 2002/0167697 A1* | 11/2002 | Willebrand | 359/152 |
| 2004/0061689 A1* | 4/2004 | Ito | 345/175 |
| 2004/0130725 A1* | 7/2004 | Kido et al. | 356/484 |
| 2004/0179848 A1* | 9/2004 | Belenkii | 398/131 |
| 2006/0060651 A1* | 3/2006 | McIntyre et al. | 235/454 |
| 2006/0251421 A1* | 11/2006 | Arnon | 398/73 |
| 2007/0031151 A1 | 2/2007 | Cunningham et al. | |
| 2007/0228280 A1* | 10/2007 | Mueller | 250/341.1 |
| 2008/0218836 A1* | 9/2008 | Suzuki et al. | 359/238 |
| 2010/0067918 A1* | 3/2010 | Federici et al. | 398/158 |
| 2010/0189437 A1* | 7/2010 | Hoshida | 398/65 |
| 2010/0282970 A1* | 11/2010 | Haran et al. | 250/339.07 |
| 2011/0187975 A1* | 8/2011 | Michaels et al. | 349/139 |

OTHER PUBLICATIONS

Nichols R. "Protocol Adaptation in Hybrid RF/Optical Wireless Networks" Military Communications Conference 2005. Milicom 2005. IEEE Atlantic City, NJ, USA. Oct. 17-20, 2005, Piscataway NJ, USA. IEEE, Piscataway, NJ, USA, Oct. 17, 2005, pp. 1-7. XP 010901554; ISBN: 978-0-7803-9393-6.

Stadler B et al. "Terahertz operational reachback (THOR) a mobile free space optical network technology program" Aerospace Conference (2004) Proceedings. IEEE, IEEE, Piscataway, NJ, USA, Mar. 6, 2004, pp. 1710-1721. XP010748290; ISBN: 978-0-7803-8155-1.

International Search Report from PCT/DE2009/000489 dated Oct. 2, 2009.

* cited by examiner

WIRELESS DATA TRANSMISSION WITH TERAHERTZ WAVES

CROSS-REFERENCE TO RELATED APPLICATIONS

This application is a U.S. National Phase application under 35 U.S.C. §371 of International Application No. PCT/DE2009/000489, filed on Apr. 8, 2009 and claims benefit to German Patent Application No. 10 2008 020 466.8 filed on Apr. 23, 2008. The International Application was published in German on Oct. 29, 2009 as WO 2009/129772 A1 under PCT Article 21(2).

FIELD

The invention concerns a method for wireless data transmission between a transmission means and a receiving means, wherein the data is modulated as signals onto an electromagnetic carrier wave in the frequency range between 0.1 and 10 terahertz. The invention also concerns a system for implementing the method.

BACKGROUND

Since the time approximately 100 years ago when first technologies for wireless data transmission began to be employed, the bandwidth available for transmission has grown continuously. As is known, the width of the frequency band that can be used for transmission depends on the carrier frequency, so that as the frequency increases, the transmission bandwidths available also increase. Nowadays, carrier frequencies in the range from a few kilohertz to many gigahertz are used. Thus, so-called "wireless HD" operates with a carrier frequency of 60 GHz and bandwidths of 4 Gbit/s. In order to be able to achieve data rates in the range of 10 Gbit/s and higher, waves in the terahertz range will also be used as carriers in the future.

The first attempts at data transmission with terahertz waves were carried out with pulsed transmitters that employed femtosecond lasers. However, broadband data transmissions require continuous-wave sources, which is to say sources of terahertz radiation that operate continuously. Such continuous-wave THz sources can be constructed from two independent lasers stabilized to one another, for example. Other continuous-wave THz sources use two-color diode lasers, which simultaneously emit two spatially superimposed waves with a spectral spacing in the THz range. Despite all efforts, however, the generation of terahertz waves today is still complicated and expensive, so that the goal is to use the limited available continuous-wave terahertz power for data transmission as efficiently as possible. In addition, it must be noted that terahertz waves are subject to strong attenuation in air, and the radiation is noticeably attenuated over distances of just a few meters even in the spectral windows that are quite transparent for terahertz waves.

SUMMARY

In an embodiment, the present invention provides a method for wireless data transmission between a transmitter and a receiver. The method includes modulating signals onto an electromagnetic carrier wave in a frequency range between 0.1 and 10 terahertz, and transmitting the carrier wave by the transmitter and focusing the transmitted carrier wave in a direction of the receiver. The transmitter is aimed towards the receiver by an adjusting system using a wireless communication link between the transmitter and the receiver so as to provide automatic aiming.

DETAILED DESCRIPTION

Figure 1:
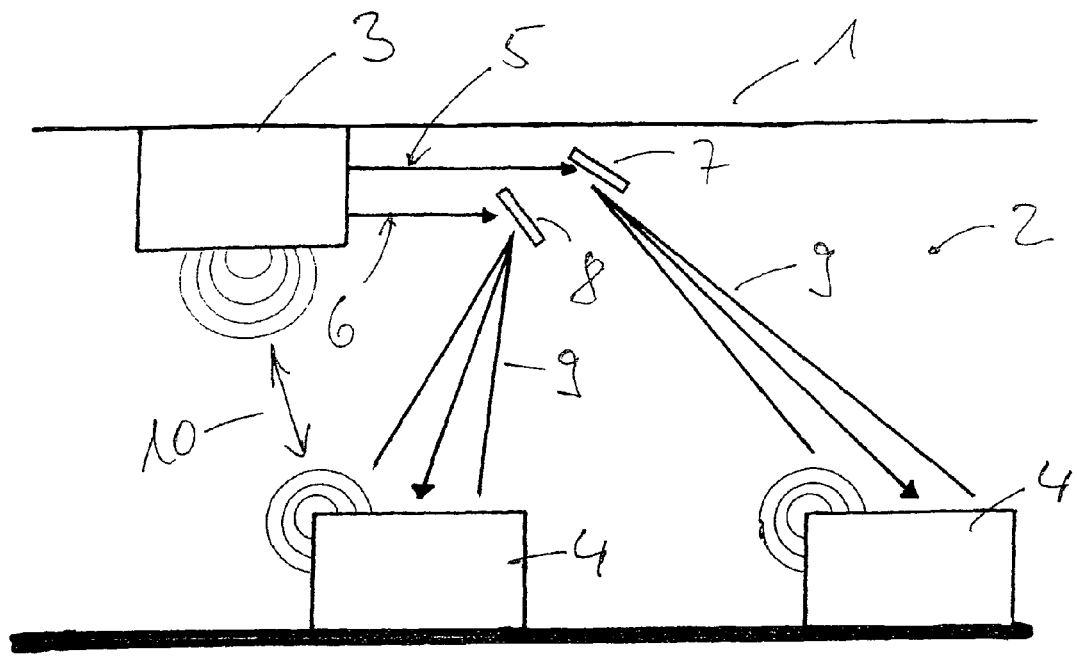
FIG. 1 is a depiction of a system including a transmitter and receiver according to one embodiment of the invention.

Embodiments of the invention provide a method that permits data transmission on the basis of terahertz waves with little effort and high effectiveness. Additional embodiments of the invention provide a system of simple construction for implementing the method.

One embodiment of the invention generates a focused carrier wave and, secondly, aims the transmitting means at the receiving means, wherein this aiming is to be optimized with regard to uninterrupted communication between these units so that the greatest possible transmission distances are achieved. To this end, the transmitting means is aimed at the receiving means by an adjusting system that automatically adjusts itself. For this purpose, the adjusting system uses a wireless communication between the units, the frequency of which lies outside the terahertz range and, in particular, uses conventional radio channels, for example Bluetooth or WLAN. Another embodiment of the invention uses a receiving device whose receiving means, in particular fibers conducting terahertz radiation, can receive directed terahertz radiation coming from different directions. In this embodiment, it is thus the receiver that is aimed at the transmitter. Naturally, it is especially advantageous when a system comprised of transmitting and receiving means implements both options, so that the transmitter automatically aims at the receiver, while the receiver itself permits directional optimization.

Since the received power available at the receiver decreases with increasing distance between transmitter and receiver even for terahertz radiation, the "directed waves," in which the transmitted power is focused in a specific direction, have a longer range than if the waves can propagate isotropically in all spatial directions. Such a directional radio in the sense of a point-to-point communication is advantageous in the present case of terahertz waves, since it is not necessary—as is known from television and radio transmission—to simultaneously supply many receivers with the same signal, which is to say that it is not necessary to supply a large area. The data transmission between transmitter and receiver desired here results in the greatest possible transmission differences due to the directed signals.

If the terahertz waves used for data transmission are produced by optical methods, for example by difference frequency mixing of two waves with frequencies in the optical spectral region, then the aperture angle of this terahertz beam can be varied in an especially simple manner by means of lenses. This beam can be aimed directly at the receiver.

In this regard, it is advantageous for effective data transmission when a direct "visual connection" exists between transmitter and receiver. This can be implemented, for example, by the means that the terahertz transmitting means is located on the ceiling of a room and thus has direct visual contact with nearly every working point in the room. If direct visual contact is not present to every desired point in the room, the terahertz wave can also be multiply reflected between the transmitter and receiver, e.g., from the walls of a room. In particular, the direction of the beam emitted by a transmitter can be adjusted by means of one or more adjustable mirrors. The distribution of the terahertz light to multiple independent mirrors permits the addressing of multiple independent receivers even when only one fundamental frequency is being used, wherein it can be advantageous for these receivers to be spatially separated to a sufficient degree. Laser galvanometers can be used as mirrors for this purpose. Also known are micromirrors, called MEMS (micro-electro-mechanical systems), which are particularly flexible and can be manufactured as a matrix. In addition, a wide variety of other options for deflecting or bending terahertz waves, such as prisms and gratings, are available and can be used for these purposes.

In order to permit the adjustment, it is advantageous for the transmitting means to contain information as to which direction it should send the terahertz light. To this end, a connection based on "conventional" radio technology can first be established between the transmitting and receiving means before the installation of the terahertz connection is initiated through this path. It is sufficient in this regard for the "conventional" radio connection to have a low bandwidth on the order of a few kbit/s. Within the framework of this connection, a determination of the relative position of the components can take place.

In addition, the signal strength arriving at the receiver can be optimized by the means that the mirror setting or the orientation of the receiver is changed. Through the conventional radio channel, the receiver reports the signal strength to the transmitter, which thereupon optimizes the transmit direction and optionally the aperture angle of the radiation.

This way of proceeding, which essentially employs unidirectional data exchange, is especially advantageous for applications such as IP-TV or downloading of music and videos. Ultimately, it is more important to receive than to transmit large quantities of data in these applications.

For special applications, it is advantageous to employ terahertz light bidirectionally. To this end, the components can be doubled in an especially simple embodiment. However, since terahertz sources are quite complex and expensive, it can be advantageous to use the same source to transmit and receive. In this regard, the receiving means can employ the terahertz source for demodulating the received signal. Two operating modes are possible here, namely simultaneous transmission and reception or alternating transmission and reception, such as is the case with intercom systems, for example.

In general, security against eavesdropping is a great advantage of directed data communications. Thus, with such a directed connection it is scarcely possible for outside users to gain access to the transmitted data. Together with the characteristic that terahertz waves do not travel very far and as a general rule do not penetrate walls, this represents a very considerable advance in comparison with hitherto known transmission by means of WLAN, for example.

The method according to embodiments of the invention is explained below with reference to FIGS. 1 and 2.

FIG. 1 shows one embodiment of the invention. In this case, a transmitting means mounted on the ceiling 1 of a room 2 and having a transmitter 3 serves two receivers 4. The transmitter 3 generates a terahertz carrier wave with two channels 5 and 6, and provides these channels with data by means of appropriate modulation. The transmitter 3 emits the two channels 5 and 6 in the direction of two mirrors 7 and 8 which are part of the transmitting means, and which are similarly hung from the ceiling in a stationary manner and are steerable by turning and tilting. Here, mirrors based on the principle of the dielectric mirror can be used to reflect the terahertz waves. Reflectors that consist of multiple polypropylene and silicon layers can also be used. Transmit cones 9 are aimed at the receivers 4 with the mirrors 7 and 8.

According to embodiments of the invention, a communication takes place between the transmitting means and the receivers 4 for the purpose of optimizing the mirror setting by means of the adjustment system. To this end, the receivers 4 communicate by means of a conventional radio connection 10 with the transmitter 3. The orientation of the mirrors 7 and 8 is changed to optimize the strength of the terahertz signal. The means for adjusting the mirrors and those for the communication are part of the automatic adjustment system.

The radio connection 10 can also be used to optimize the transmit power, which is to say to reduce it in the case of a good connection or increase it in the case of a poor connection. This is particularly advantageous when only a small amount of time is available for data exchange, for example when downloading data from a moving receiver. In this way, devices can be loaded within a short time in a sort of "burst mode." The radio signal, which reaches further and is straightforward to handle, can announce and prepare for the data transmission with the terahertz light. In this context, the transmitter 3 can even be operated briefly above its power specification if it is clear that this is not needed continuously, and the transmitter 3 will therefore not be destroyed. In this way, it is possible to increase the range in situations in which devices must be "loaded" with data within a short period of time.

Since conventional receivers such as photo mixers or non-linear optical elements exhibit direction-dependent sensitivity, it can be advantageous to also perform an appropriate aiming at the incoming beam at the receiver. Here, too, a movable mirror attached to the receiver can ensure that the terahertz radiation is optimally directed onto the receiver. Alternatively, fibers could also be used to receive terahertz waves from different directions and then direct them onto a detector present in the receiver component.

Figure 2:
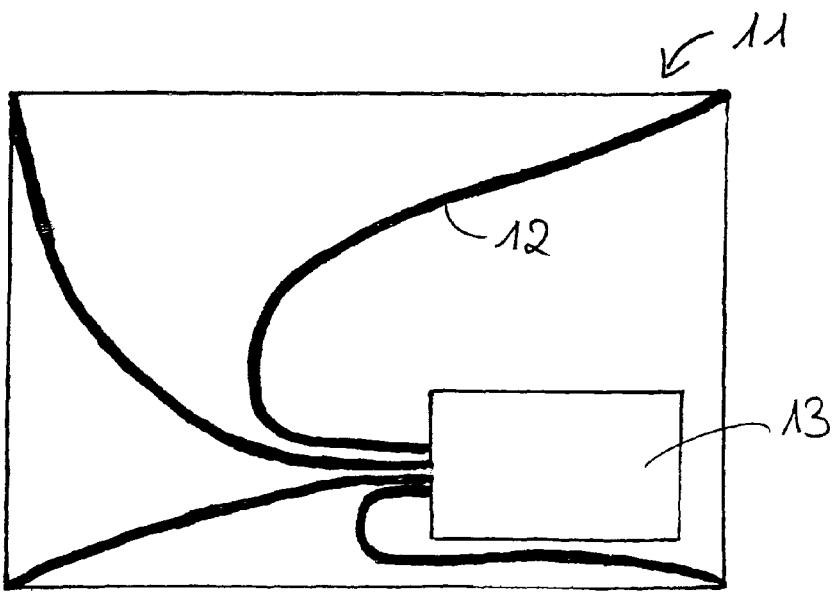
FIG. 2 illustrates a receiver according to one embodiment of the invention.

FIG. 2 schematically shows such a receiver component with integrated fibers. Here, fibers 12 for conducting terahertz light are arranged in the device 11, which can be a mobile telephone or portable computer. A number of polymers are suitable for producing such fibers. The fibers 12 are arranged such that they point outward at different corners of the housing. In the example embodiment according to the drawing, four fibers 12 are drawn in by way of example, wherein their number can be considerably higher.

Moreover, it can be advantageous when an additional optical component, for example a lens, is installed in front of the outward-projecting end of each of the fibers in order to focus the incoming terahertz wave. The fibers then conduct the THz signal to the actual detector 13 and there transmit it in parallel such that the detector can detect it even using a detection method that requires the terahertz wave to be incident on the actual detector within a specific angular range.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method the wireless data transmission between a transmitter and two receivers within a room, the method comprising:
    modulating data to be transmitted onto a first electromagnetic carrier wave in a frequency range between 0.1 and 10 terahertz and a second electromagnetic carrier wave in a frequency range between 0.1 and 10 terahertz;
    transmitting the first and second carrier waves by the transmitter; and
    focusing the transmitted first carrier wave in a direction of a first receiver and focusing the transmitted second carrier wave in a direction of a second receiver, wherein the first and second receivers each comprise optical fibers for conducting terahertz light arranged such that the optical fibers of each receiver point outward to at least two different corners of the respective receiver;
    wherein the first and second carrier waves transmitted by the transmitter are aimed towards the first and second receivers, respectively, by an adjusting system using a wireless communication link between the transmitter and the first and second receivers so as to provide automatic aiming.

2. The method of claim 1 further comprising producing the first carrier wave by difference frequency mixing of two waves.

3. The method of claim 2 wherein the two waves have frequencies in the optical spectral region.

4. The method of claim 1, wherein the transmitter and the first and second receivers are disposed so as to provide a visual connection therebetween.

5. The method of claim 4 wherein the visual connection exists via a first mirror along a transmission path of the transmitted first carrier wave and via a second mirror along a transmission path of the transmitted second carrier wave.

6. The method of claim 1 wherein the automatically aiming is provided using a wireless communication system, the wireless communication system announcing a connection between the transmitter and the first and second receivers and exchanging information for an optimal direction of the transmitting of the first and second carrier waves.

7. The method of claim 1, wherein each of the optical fibers of the first and second receivers comprises a lens installed at an outward-projecting end of each respective optical fiber.

8. The method of claim 1, wherein the optical fibers of the first receiver are configured to conduct signals corresponding to the first carrier wave to a detector of the first receiver, and wherein the optical fibers of the second receiver are configured to conduct signals corresponding to the second carrier wave to a detector of the second receiver.

9. A system for wireless data transmission, the system comprising: a transmitter configured to transmit data to be transmitted modulated onto a first electromagnetic carrier wave in a frequency range between 0.1 and 10 terahertz and a second electromagnetic carrier wave in a frequency range between 0.1 and 10 terahertz; a first receiver configured to receive the first carrier wave and a second receiver configured to receive the second carrier wave, wherein the first and second receivers each comprise optical fibers for conducting terahertz light arranged such that the optical fibers of each receiver point outward to at least two different corners of the respective receiver; an adjustment system configured to automatically aim the first and second carrier waves transmitted by the transmitter at the first and second receivers, respectively; and a wireless communication system configured to support the adjustment system.

10. The method of claim 9, wherein the optical fibers of the first receiver are configured to conduct signals corresponding to the first carrier wave to a detector of the first receiver, and wherein the optical fibers of the second receiver are configured to conduct signals corresponding to the second carrier wave to a detector of the second receiver.

11. The system of claim 9 wherein each of the optical fibers of the first and second receivers comprises a lens installed at an outward-projecting end of each respective optical fiber.

12. The system of claim 9 wherein the transmitter includes at least one mirror, and wherein the adjustment system is configured to move the at least one mirror so as to aim the carrier wave at the receiver.

13. The system of claim 9 wherein the transmitter includes bending elements controllable at least one of electrically and by light configured to aim the first and second carrier waves at the first and second receivers, respectively.

14. The system of claim 9 further comprising a measurement system configured to determine relative positions of the transmitter and the first and second receivers.

* * * * *